US007103436B2

United States Patent
Denton et al.

(10) Patent No.: US 7,103,436 B2
(45) Date of Patent: Sep. 5, 2006

(54) METHOD FOR OPTIMIZING FOUNDRY CAPACITY

(75) Inventors: Brian T. Denton, Winooski, VT (US); Robert J. Milne, Jericho, VT (US); Robert A. Orzell, Essex Junction, VT (US); Satyadeep Vajjala, Colchester, VT (US); Jacqueline N. Ward, Colchester, CT (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 10/707,976

(22) Filed: Jan. 29, 2004

(65) Prior Publication Data
US 2005/0171625 A1 Aug. 4, 2005

(51) Int. Cl.
*G06F 19/00* (2006.01)
(52) U.S. Cl. ..................................... 700/102; 700/103
(58) Field of Classification Search ................ 700/102, 700/100, 101, 103, 97
See application file for complete search history.

(56) References Cited

U.S. PATENT DOCUMENTS

| 5,943,484 | A | 8/1999 | Milne et al. | |
| 5,971,585 | A | 10/1999 | Dangat et al. | |
| 6,341,240 | B1* | 1/2002 | Bermon et al. | ............... 700/97 |
| 6,731,999 | B1* | 5/2004 | Yang et al. | ................. 700/102 |
| 2004/0186605 | A1* | 9/2004 | Wu et al. | .................... 700/102 |
| 2005/0096771 | A1* | 5/2005 | Denton et al. | .............. 700/103 |

OTHER PUBLICATIONS

Leachman et al., "IMPRESS: An Automated Production-Planning and Delivery-Quotation System at Harris Corporation-Semiconductor Sector", Interfaces vol. 26:1, pp. 6-37, 1996.
Nemhauser et al., "Interger and Combinatorial Optimization", Chapter 2—Linear Programmig, pp. 27-41, 1999.
G. Dantzig, "Linear Programmign and Extensions", Princeton University Press, pp. 448-455, 1963.

* cited by examiner

*Primary Examiner*—Leo Picard
*Assistant Examiner*—Steven R. Garland
(74) *Attorney, Agent, or Firm*—Gibb I.P. Law Firm, LLC; Richard M. Kotulak, Esq.

(57) ABSTRACT

The invention provides a method and system for determining a production plan that includes a first step that determines the minimum number of manufacturing starts that are required to meet contractual obligations; and a second step which determines a production plan satisfying the minimum manufacturing starts together with other customer demands. More specifically, the invention presents a method of allocating production starts (e.g., wafer starts) in a manufacturing facility (e.g., wafer foundry) using a linear programming production planning system which performs a first stage of linear programming to satisfy only contractually mandated minimum production starts constraints followed by a second stage of linear programming to satisfy the additional constraints, once the minimum starts constraints are satisfied.

38 Claims, 7 Drawing Sheets

METHOD FOR OPTIMIZING FOUNDRY CAPACITY

CROSS REFERENCE TO RELATED APPLICATIONS

The present application is related to pending U.S. patent application Ser. No. 10/707,978, filed concurrently herewith to Denton et al., entitled "A METHOD FOR SUPPLY CHAIN COMPRESSION"; U.S. patent application Ser. No. 10/707,974, filed concurrently herewith to Denton et al., entitled "METHOD FOR PURCHASE ORDER RESCHEDULING IN A LINEAR PROGRAM"; U.S. patent application Ser. No. 10/707,977, filed concurrently herewith to Denton et al., entitled "A METHOD FOR SUPPLY CHAIN DECOMPOSITON"; U.S. patent application Ser. No. 10/707,972, filed concurrently herewith to Denton et al., entitled "METHOD FOR FAIR SHARING LIMITED RESOURCES BETWEEN MULTIPLE CUSTOMERS"; U.S. patent application Ser. No. 10/707,979, filed concurrently herewith to Denton et al., entitled "A METHOD FOR CONSIDERING HIERARCHICAL PREMPTIVE DEMAND PRIORITIES IN A SUPPLY CHAIN OPTIMIZATION MODEL"; U.S. patent application Ser. No. 10/707,973, filed concurrently herewith to Denton et al., entitled "METHOD FOR SIMULTANEOUSLY CONSIDERING CUSTOMER COMMIT DATES AND CUSTOMER REQUEST DATES"; and U.S. patent application Ser. No. 10/708,119, filed concurrently herewith to Orzell et al., entitled "METHOD FOR IDENTIFYING PRODUCT ASSETS IN A SUPPLY CHAIN USED TO SATISFY MULTIPLE CUSTOMER DEMANDS". The foregoing applications are assigned to the present assignee, and are all incorporated herein by reference.

BACKGROUND OF INVENTION

1. Field of the Invention

The present invention relates to computer implementable decision support systems for determining production plans which honor contractual obligations such as those concerning the microelectronics foundry business. General methodologies within this field of study include advanced planning systems, optimization and heuristic based algorithms, constraint based programming, and simulation.

2. Description of the Related Art

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers" demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming.

The below-referenced U.S. patents disclose embodiments that were satisfactory for the purposes for which they were intended. The disclosures of both the below-referenced prior U.S. patents, in their entireties, are hereby expressly incorporated by reference into the present invention for purposes including, but not limited to, indicating the background of the present invention and illustrating the state of the art: U.S. Pat. No. 5,971,585, "Best can do matching of assets with demand in microelectronics manufacturing," Oct. 26, 1999; U.S. Pat. No. 5,943,484, "Advanced material requirements planning in microelectronics manufacturing," Aug. 24, 1999; and Nemhauser, G. L. and Wolsey, L. A., 1999, Wiley, *Integer and Combinatorial Optimization.*

SUMMARY OF INVENTION

The invention provides a method and system for determining a production plan that includes a first step that determines the minimum number of manufacturing starts that are required to meet contractual obligations; and a second step which determines a production plan satisfying the minimum manufacturing starts together with other customer demands. More specifically, the invention presents a method of allocating production starts (e.g., wafer starts) in a manufacturing facility (e.g., wafer foundry) using a linear programming production planning system which performs a first stage of linear programming to satisfy only contractually mandated minimum production starts constraints followed by a second stage of linear programming to satisfy the additional constraints, once the minimum starts constraints are satisfied.

The first stage of linear programming only allocates production starts up to contractually mandated minimums and additional production starts are allocated in the second stage of linear programming. The first stage of linear programming disables stability constraints, and the second stage of linear programming enables stability constraints. The first stage of linear programming disables constraints relating to customers that do not have contractually mandated minimum production starts obligations, and the second stage of linear programming enables constraints relating to customers that do not have contractually mandated minimum production starts obligations.

The first stage of linear programming considers part numbers, time periods, and locations in the contractually mandated minimum production starts constraints. The first stage of linear programming ensures that the second stage of linear programming will meet contractually mandated minimum production starts constraints. The first stage of linear programming allows the second stage of linear programming to allocate production starts based on constraints other than the contractually mandated minimum production starts constraints.

BRIEF DESCRIPTION OF DRAWINGS

Brief Description of the Drawings

Figure 1:
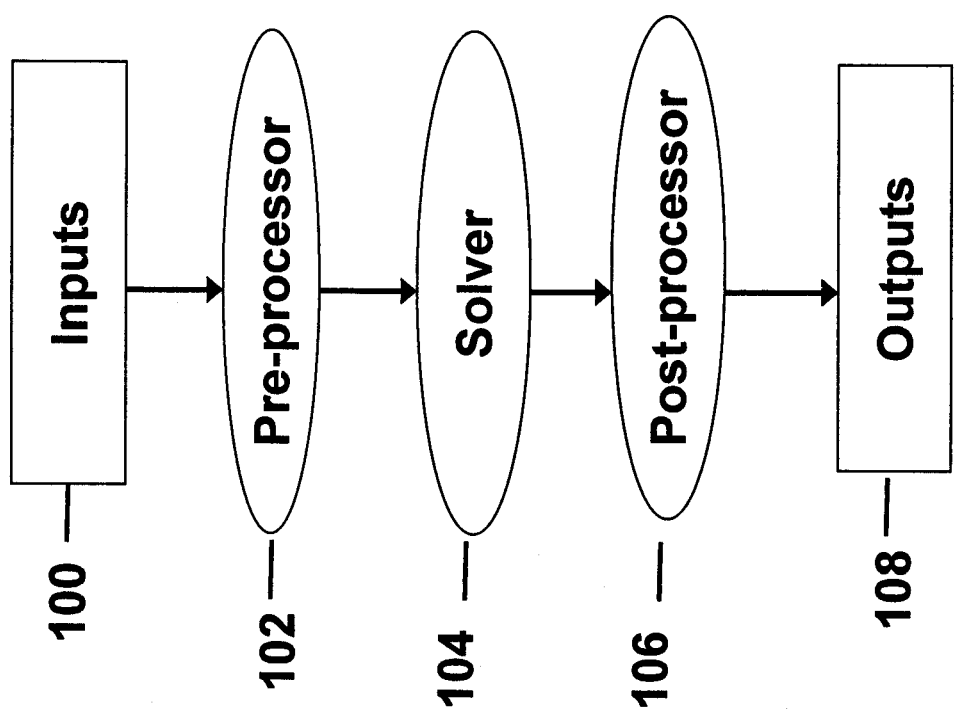

FIG. 1: Overview of the structure of a linear programming application.

Figure 2:
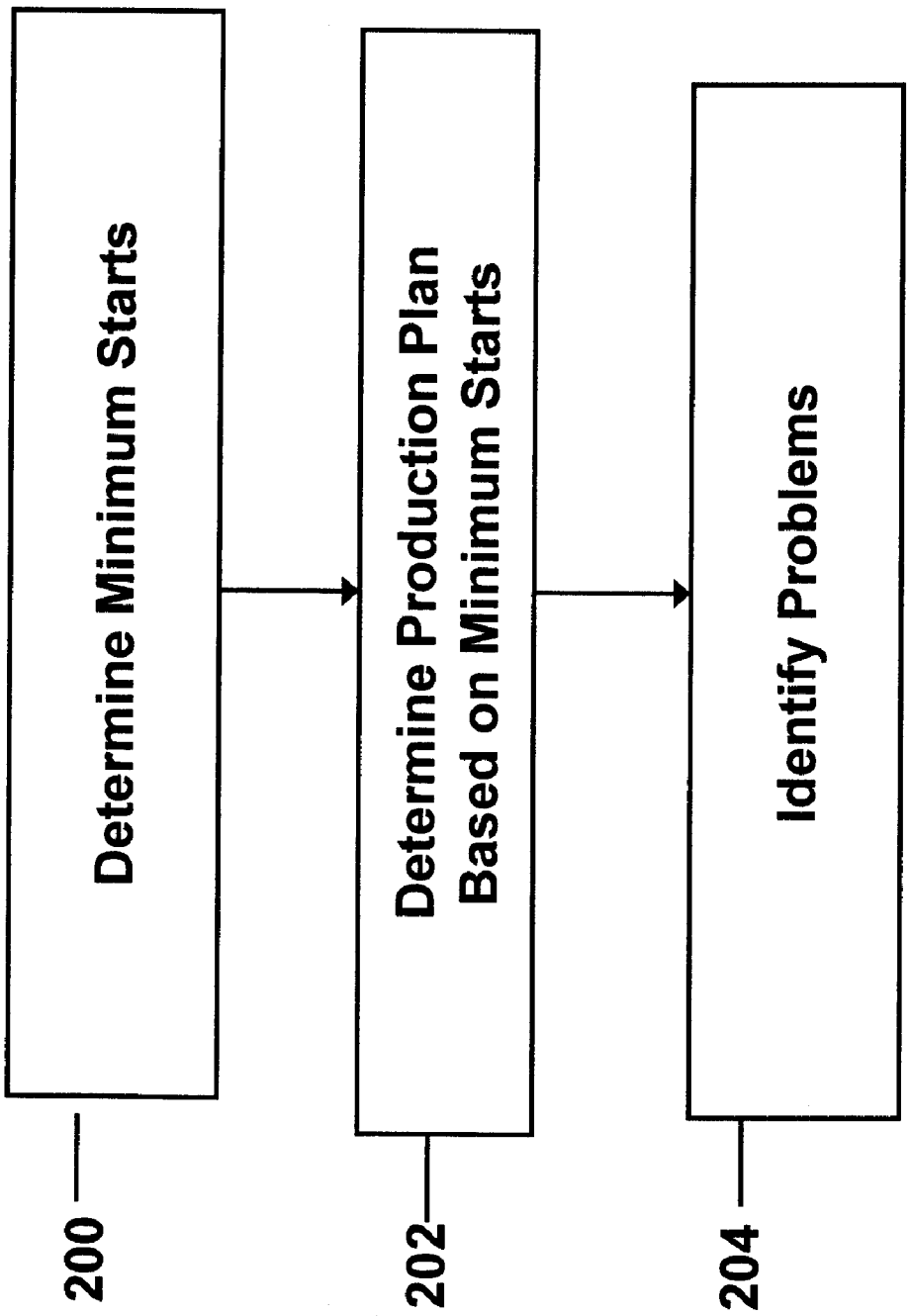

FIG. 2: Overview of the major steps of a preferred embodiment of the invention.

Figure 3:
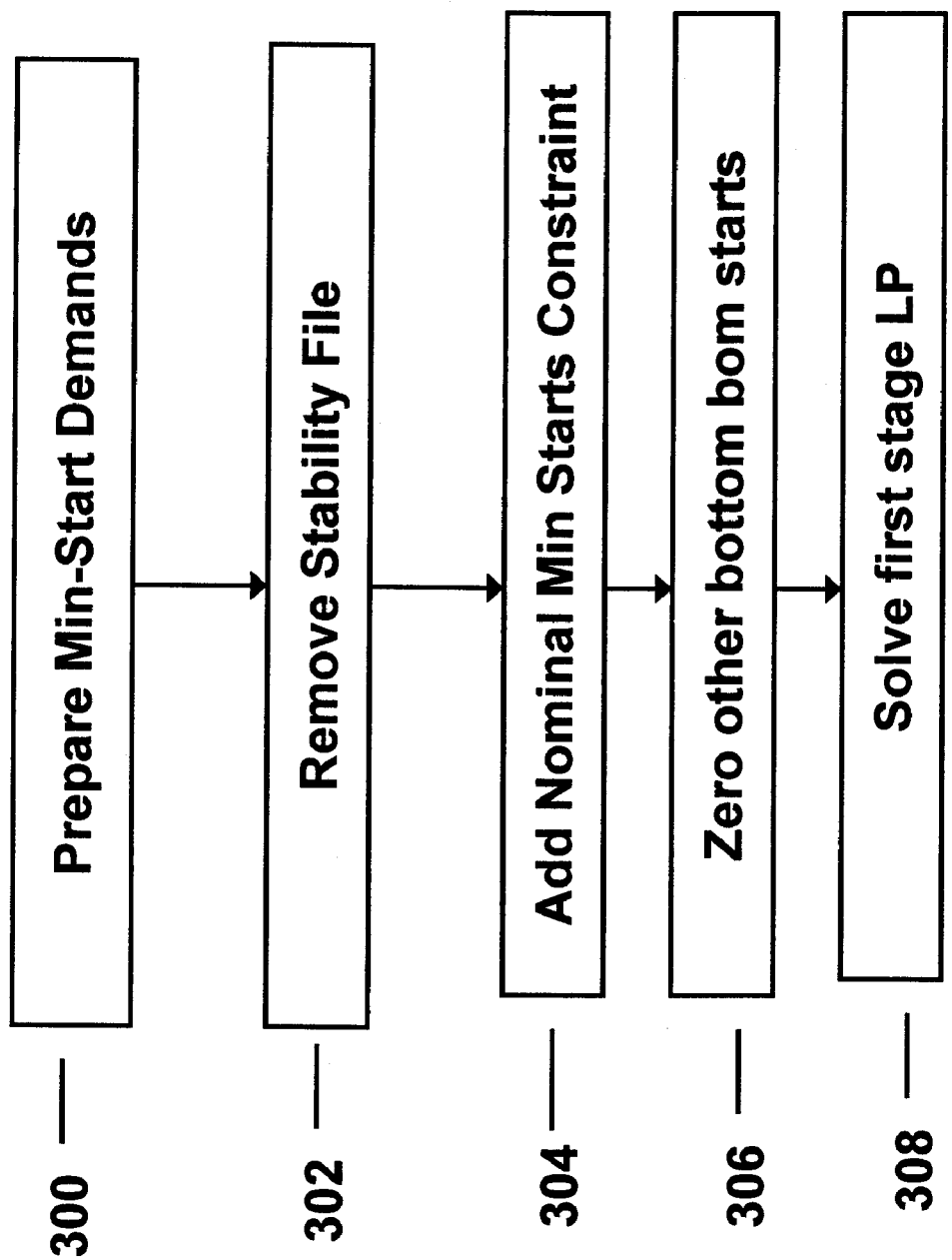

FIG. 3: Summary of steps involved in determining the minimum number of manufacturing starts.

Figure 4:
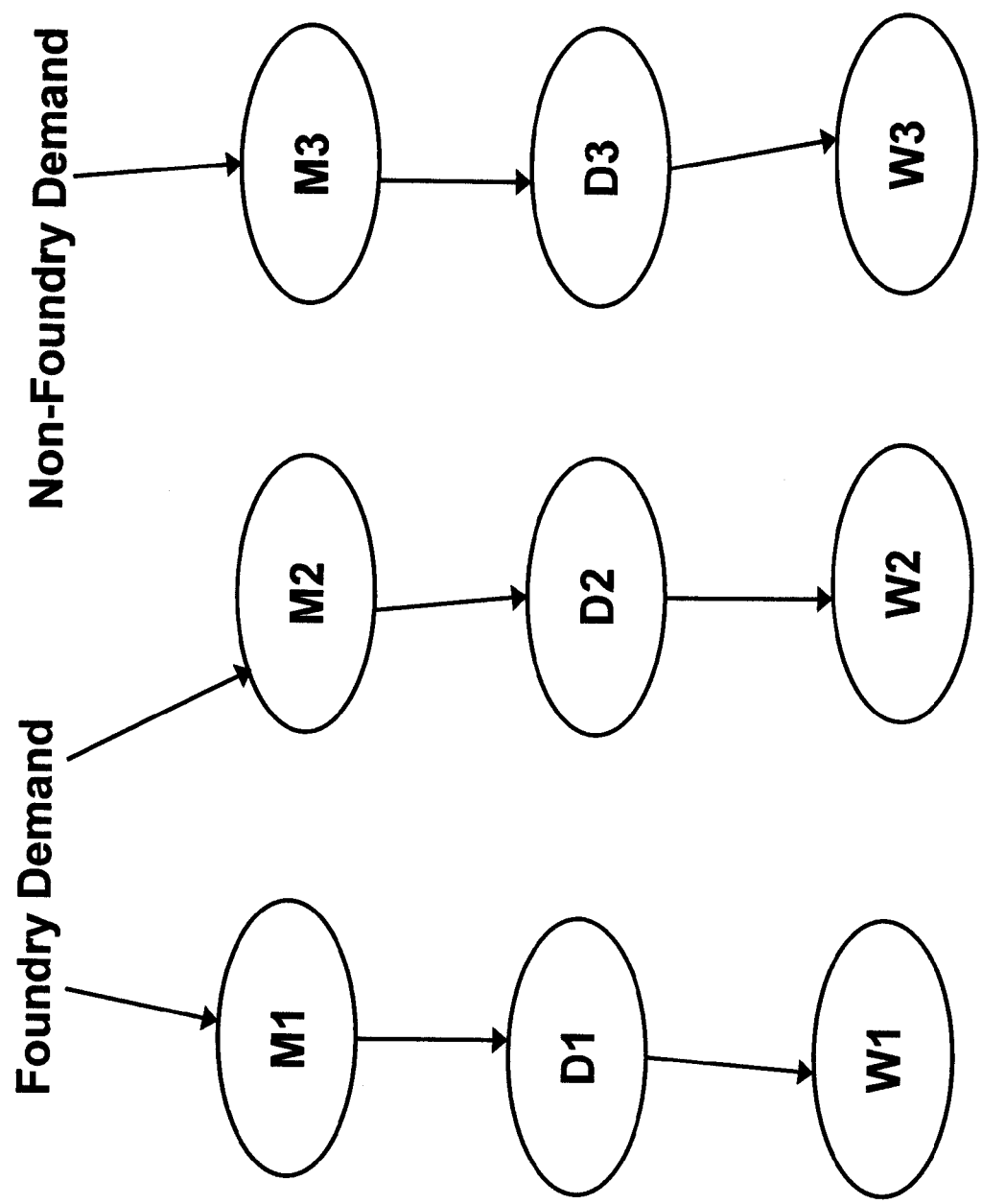

FIG. 4: Illustration of bills of materials supply chain for foundry and non-foundry demands.

Figure 5:
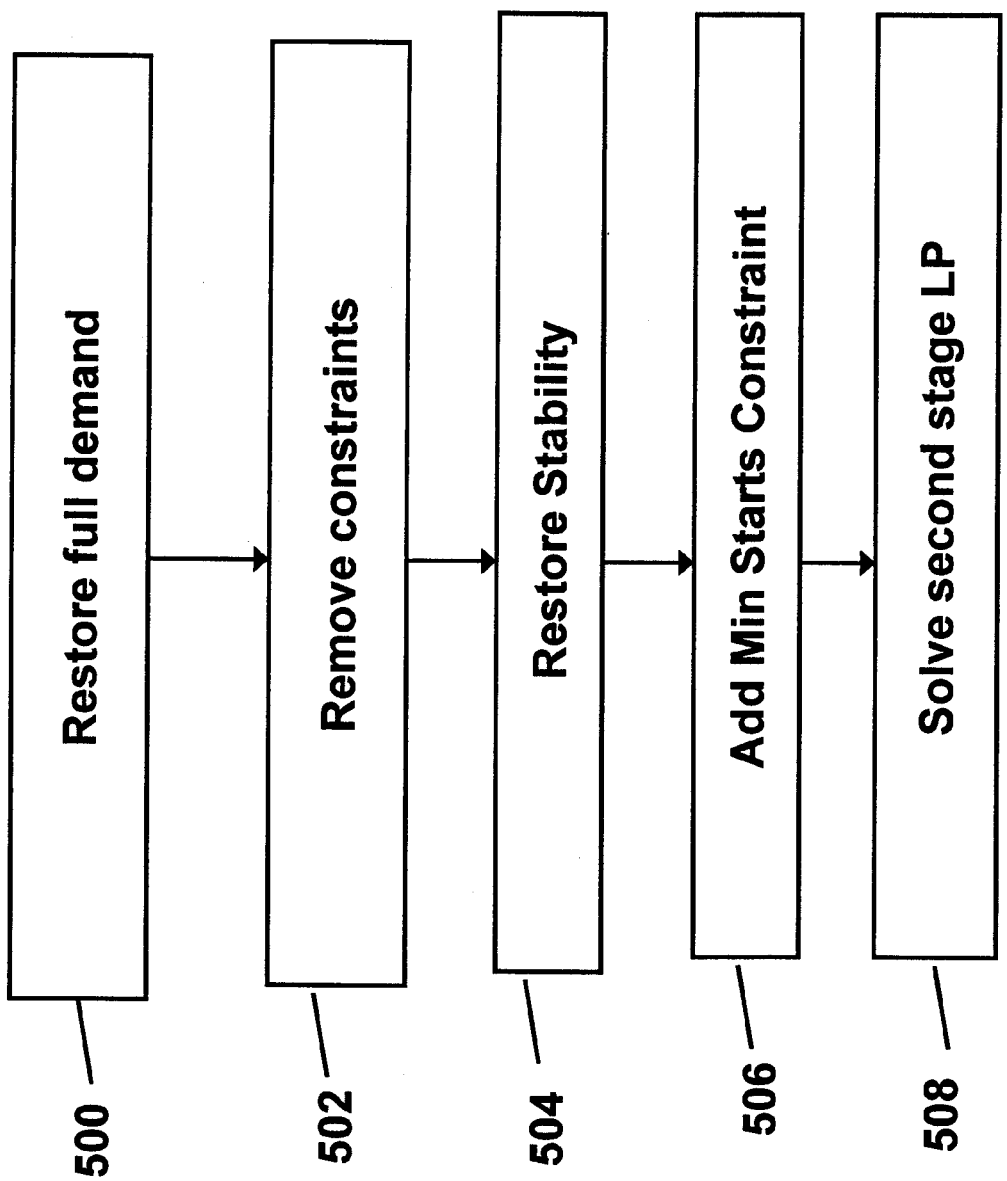

FIG. 5: Summary of the major steps involved in determining the production plan given a minimum number of manufacturing starts.

Figure 6:
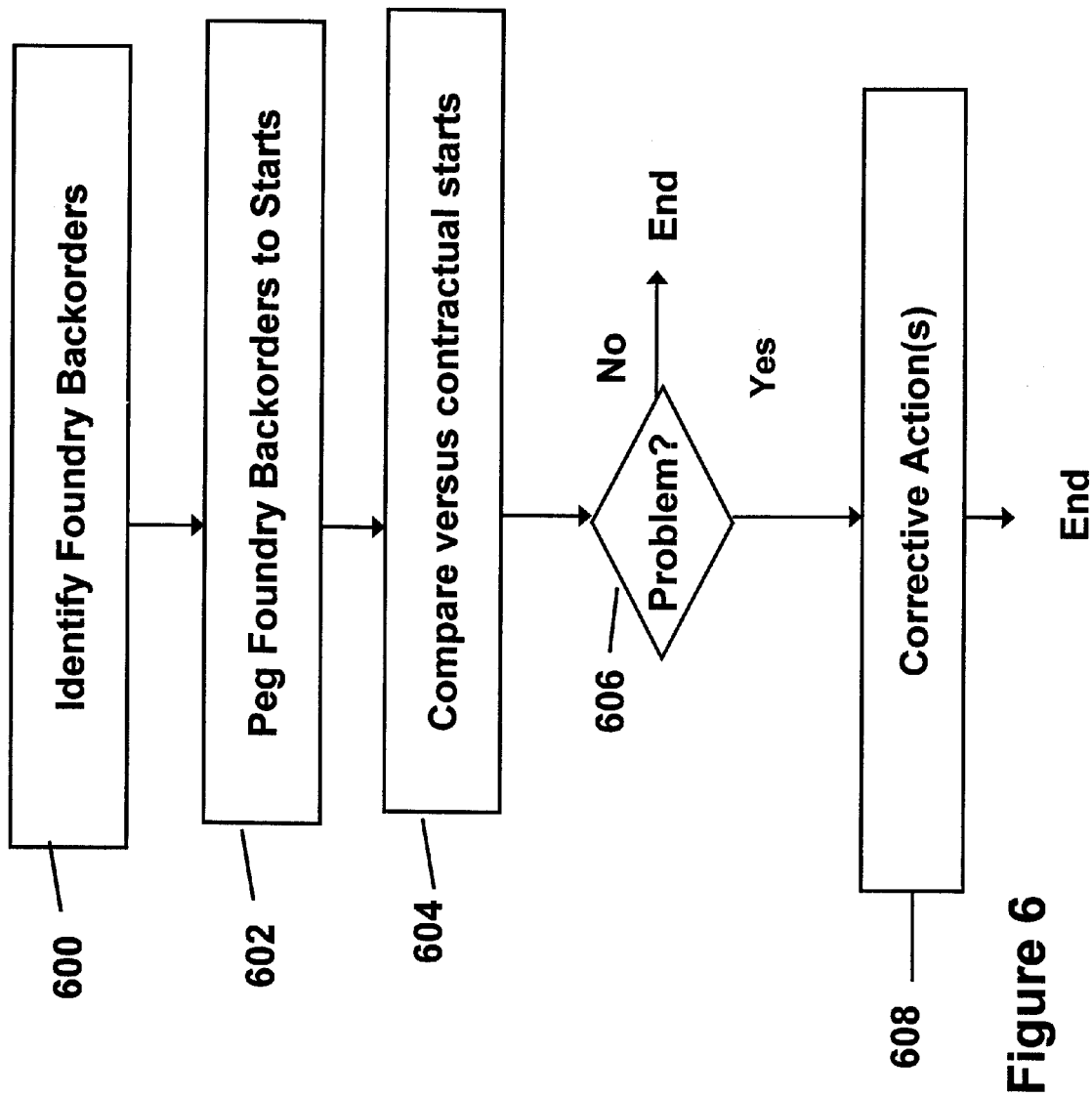

FIG. 6: Summary of steps involved in determining whether the contractual obligations may be satisfied.

Figure 7:
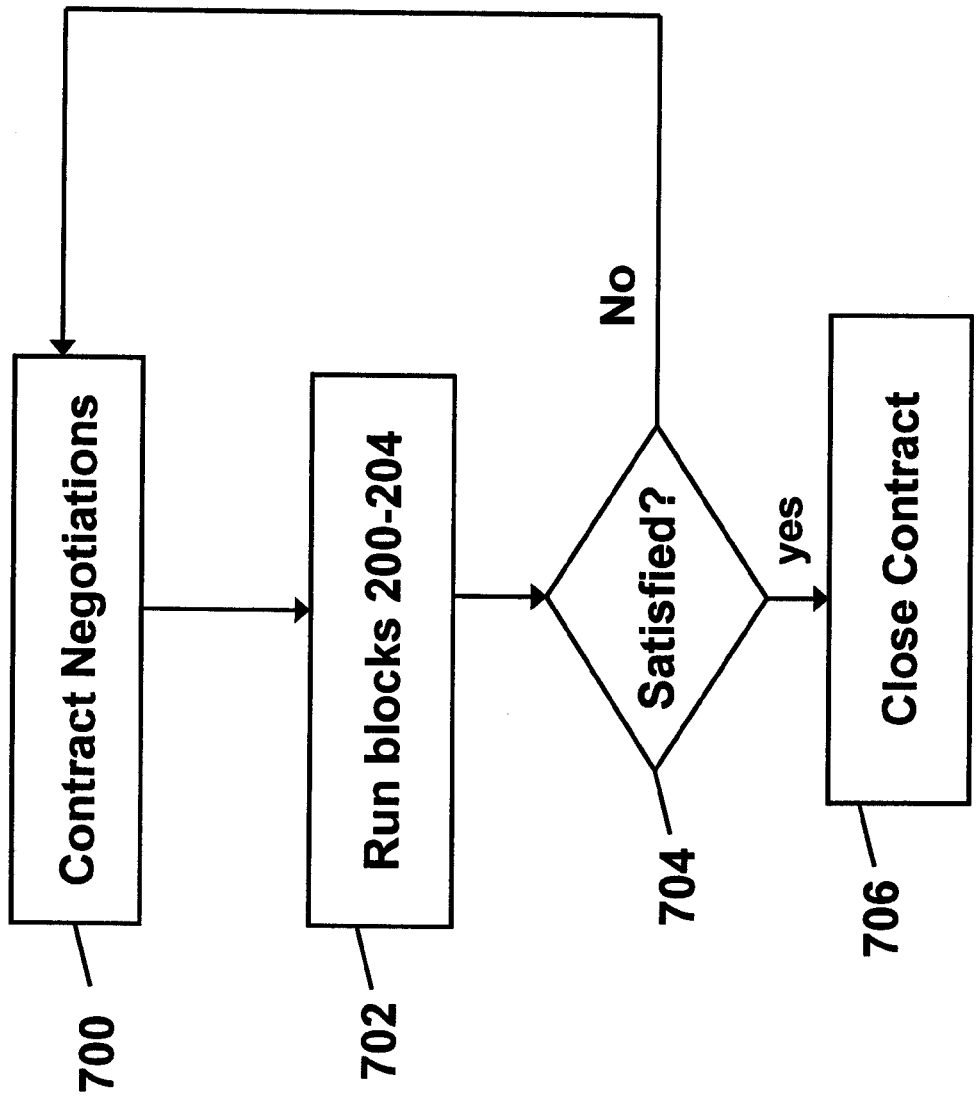

FIG. 7: summary of steps involved in applying the invention to contract negotiations.

DETAILED DESCRIPTION

The invention is implemented through a multi-stage linear programming (LP) based method. The first of two LP runs considers only foundry demand. That first LP run also contains a constraint that prevents allocation of wafer starts from exceeding the minimum starts required by the contract. Thus, the first LP run satisfies minimum contractual obligations up to the minimum starts required by the contract, and this first LP run does not allocate any additional foundry capacity beyond this contractually required number of minimum starts, as this capacity will be provided in the second LP run. The wafer starts resulting from that first run are those needed to meet the foundry demand and satisfy the nominal minimum starts.

These wafer starts are used to create a new constraint used by the second LP run, which considers all demand (foundry and non-foundry). This new constraint ensures that the second LP run's wafer starts must be at least as great as those resulting from the first LP run on a cumulative basis across time. In other words, this process first allocates wafer starts only to those customers that have a contractually mandated minimum number of wafer starts, up to the minimum level of wafer starts. After these minimums are allocated, the remainder of the foundry capacity of wafer starts is allocated according to the remaining constraints of the LP program, without having to consider contractually mandated minimum starts. This allows the second LP run to release those foundry wafer starts earlier than required, if so doing allows a better satisfaction of non-foundry demand. The net result is that the second LP run is ensured to meet the contractual obligations while at the same time optimally allocating resources for non-foundry demands. A series of post-processing calculations determine whether any unsatisfied foundry demand stemmed from an inability to meet the contractual wafer starts. This information is provided to the user so that any necessary corrective actions are taken (e.g. capacity increase).

While the invention is described with respect to a "foundry minimum starts contract," one ordinarily skilled in the art would understand that the invention is applicable to other situations whether stemming from an explicit contractual relationship or a business policy aimed at behaving as if the relationship/policy requirement was contractual. The term "foundry" should be understood in that broad context and should in no way limit the scope of the invention's applicability. Furthermore, the invention is usable outside of the microelectronics industry.

To contrast the present invention, a conventional production planning linear program "LP" is shown below (such as that described in U.S. Pat. No. 5,971,585, which is incorporated herein by reference). This LP makes decisions including: production starts, material substitutions, and shipments planned to customers, between manufacturing and distribution locations, and from vendor suppliers. A LP is composed of an objective function that defines a measure of the quality of a given solution, and a set of linear constraints. The types of equations used in production planning models are well known to those practiced in the art and include: (1) Material Balance Constraints, which ensure conservation of material flow through the network of stocking points comprising the supply chain.

(2) Capacity Constraints, which ensure that the capacity available for manufacturing activities is not exceeded.

(3) Backorder Conservation Constraints, which balance the quantity of a given part backordered in a given planning period with the quantity backordered in the previous planning period and the net of new demand and new shipments.

(4) Sourcing Constraints, which define target ranges (minimum and maximum) of shipments that should be made from a particular manufacturing or vendor location in the supply chain.

A conventional LP formulation is provided below in the form familiar to those practiced in the art; i.e., definition of subscripts, definition of objective function coefficients, definition of constants, definition of decision variables, LP formulation or equations.

Definition of Subscripts
j—time period
m—material (part number)
a—plant location within the enterprise
n—material being substituted
z—group (which represents a family or collection of part numbers)
e—process (a method of purchasing or manufacturing a material at a plant)
v—receiving plant location
k—demand center (i.e., customer location) (Note: the set of customer locations is mutually exclusive from the set of plant locations)
q—demand class which indicates relative priority
w—resource capacity which could be a machine, labor hour, or other constraint
u—represents a consumer location which refers to an internal plant, external demand center, or toa generic indicator meaning any plant/or demand center Definition of Objective Function Coefficients
$PRC_{jmae}$—cost of releasing one piece of part m during period j at plant a using process e
$SUBC_{jmna}$—substitution cost per piece of part number n which is being substituted by part number m during period j at plant a
$TC_{jmav}$—transportation cost per piece of part number m leaving plant a during period j which are destined for plant v
$INVC_{jma}$—inventory cost of holding one piece of part number m at the end of period j at a particular plant a
$DMAXC_{jzau}$—cost per piece of exceeding the maximum amount of shipments of group z parts from plant a to consuming location(s) u during period j
$DMINC_{jzau}$—cost per piece of falling short of the minimum amount of shipments specified for group z parts from plant a to consuming location(s) u during period j
$BOC_{jmkq}$—backorder cost of one piece of part m at the end of period j for class q demand at customer location k Definition of Constants
$DEMAND_{jmkq}$—demand requested during time period j for part number m at customer location k for demand class q
$RECEIPT_{jma}$—quantity of projected wip and purchase order receipts for part number m expected to be received at plant a during time period j
$CAPACITY_{jaw}$-Capacity of resource w available at plant a during period j to support production starts $CAPREQ_{jmaew}$—Capacity of resource w required for part number m at plant a for process e during period j $QTYPER_{jmaen}$—quantity of component m needed per part number n during period j at plant a using process e $YIELD_{jmae}$—output of part number m per piece released or started at plant a during time period j using process e $SUBQTY_{jmna}$—quantity of part number m required to substitute for one piece of part number n at plant a during time period j $MAXPCT_{jzau}$—maximum percentage of total shipments of group z (collection of parts) leaving supplier a during period j to support consumption at consuming location(s) u $MINPCT_{jzau}$—minimum percentage of total shipments of group z (collection of parts) leaving supplier a during period j to support consumption at consuming location(s) u $CT_{jmae}$—Cycle time. The number of periods between the release and completion of part m jobs for releases made using process e at plant a during time period j $TT_{mav}$—transport time for part number m from plant a to plant v Definition of LP Decision Variables $I_{jma}$—Inventory at the end of period j for part number m at a particular plant a $P_{jmae}$ Production starts of part m during period j at plant a using process e $L_{jmna}$—Quantity of part number n which is being substituted by part number m during period j at plant a $T_{jmav}$—Internal shipments of part number m leaving plant a during period j which are destined for plant v $F_{jmakq}$—Shipments of part number m leaving plant a during period j and satisfying class q demand at external customer k $B_{jmkq}$—Back orders of part m at the end of period j for class q demand at customer location k $H_{jzu}$—Total shipments of group z (z is a "collection" of parts) leaving suppliers during period j to support consumption at consuming location(s) u $S_{jzau}$—Amount by which total shipments of parts in z from plant a to consuming location(s) u during period j exceeds the maximum amount specified as desired in the sourcing rules $G_{jzau}$—Amount by which total shipments of group z parts from plant a to consuming location(s) u during period j falls short of the minimum amount specified as desired in the sourcing rules LP Equations or Formulation The following minimizes the objective function subject to the constraints shown below.

Objective Function:
Minimize $$\sum_j \sum_m \sum_a \sum_e PRC_{jmae} P_{jmae} +$$

$$\sum_j \sum_m \sum_n \sum_a SUBC_{jmna} L_{jmna} + \sum_j \sum_m \sum_a \sum_v TC_{jmav} T_{jmav} +$$

$$\sum_j \sum_m \sum_a INVC_{jma} I_{jma} + \sum_j \sum_z \sum_a \sum_u DMAXC_{jzau} S_{jzau} +$$

$$\sum_j \sum_z \sum_a \sum_u DMINC_{jzau} G_{jzau} + \sum_j \sum_m \sum_k \sum_q BOC_{jmkq} B_{jmkq}$$

Subject to:
Sourcing Constraints:

$$H_{jzu} = \sum_{\substack{m \\ \varepsilon z}} \sum_a \left( T_{jmau} + \sum_q F_{jmauq} \right) \sum_{\substack{m \\ \varepsilon z}} \left( T_{jmau} + \sum_q F_{jmauq} \right) - S_{jzau} \le$$

$$MAXPCT_{jzau} H_{jzu} \sum_{\substack{m \\ \varepsilon z}} \left( T_{jmau} + \sum_q F_{jmauq} \right) + G_{jzau} \ge MINPCT_{jzau} H_{jzu}$$

Capacity Constraints:

$$\sum_m \sum_e CAPREQ_{jmaew} P_{jmae} \le CAPACITY_{jaw}$$

Backorder Constraints:

$$B_{jmkq} = B_{(j-1)mkq} + DEMAND_{jmkq} - \sum_a F_{jmakq}$$

Material Balance Constraints:

$$I_{jma} = I_{(j-1)ma} + RECEIPT_{jma} + \sum_{\substack{xs,t \\ x+CTxmae=j}} \sum_e YIELD_{xmae} * P_{xmae} +$$

$$\sum_n L_{jmna} + \sum_{\substack{xs,t \\ x+TTmav=j}} \sum_v T_{xmna} - \sum_n SUBQTY_{jmna} * L_{jmna} -$$

$$\sum_v T_{jmav} - \sum_k \sum_q F_{jmakq} - \sum_{\substack{nst,m \\ isacomponent \\ ofn}} \sum_e QTYPER_{jmaen} P_{jnae}$$

Non-Negativity Constraints:

all $X_{i,j\ldots} \ge 0$, where X is a generic decision variable and i, j etc. represent generic subscripts The supply chain linear programming model shown above, does not consider some aspects of foundry manufacturing including minimum quantity of starts per day. In the microelectronics foundry business, the customer often provides the semiconductor chip designs and the manufacturer builds the products. Because the yield depends upon the customers" chip designs as well as the manufacturing process, legally binding contracts may specify a minimum quantity of starts per day that will be released to the manufacturing line to support a particular foundry customer's demands. Essentially, this allows customers to reserve manufacturing capacity. Typically, such minimum starts are required to be released only to the extent that they are useable in supporting the customer's end-item demands.

As shown in FIG. 1, linear programming applications typically include the transformation of input files (block 100) into output files (block 108) through a pre-processor (block 102), solver (block 104), and post-processor (block 106) as shown in FIG. 1. The pre-processor (block 102) transforms the raw input files into a form useable by the linear programming solver. The solver (block 104) determines an optimal raw output solution which is transformed by the post-processor (block 106) into a format acceptable for usage.

FIG. 4 provides a simplified representation of a supply chain in the microelectronics industry. In this figure, modules M1, M2, and M3 are assembled from component devices D1, D2, and D3 respectively which result from wafer starts of wafers M1, W2, and W3. Each of the elliptical elements of FIG. 4 represents a part number. Modules M1 and M2 have foundry (contractual) demand while module M3 has non-foundry demand. In this particular example, this could mean that modules M1 and M2 are built to meet the specifications of a customer owned design whereas module M3 may be built to meet the specification of a manufacturer's owned design. There are other relationships which may be considered foundry (e.g. large volume ASICS production). A typical foundry contract may require the manufacturer to start (i.e. release) a minimum number of wafers per day (e.g. M1) so long as there is sufficient end-item demand (e.g. M1) available to consume the supply resulting from the minimum wafer starts.

FIG. 2 summarizes the major steps of the invention. Block 200 determines the minimum number of starts required to be released into the manufacturing line in order to support the contractual obligation. This block considers both the nominal minimum starts specified in the contract as well as the foundry demand. The minimum starts output by block 200 are used as input by block 202. Block 202 determines the production plan that satisfies those minimum starts resulting from block 200. Subsequently, block 204 identifies any problems in satisfying the contractual requirements (e.g., if a capacity limitation prevents the satisfaction of demand). These major steps summarized in FIG. 2 are discussed in more detail below.

FIG. 3 contains the major steps encompassed in block 200''s determination of the minimum number of starts required to satisfy the contractual obligations. Recall that the contractual obligation is to satisfy the nominal quantity of wafer starts specified in the contract to the extent that there is sufficient foundry demand to consume those nominal wafer starts. The foundry demand is placed into the demand file and used by the first invocation of the linear programming solver. Depending upon the nature of the contractual obligation and the manufacturer's business policy, the foundry demand may be placed into the demand file as if it were due at some time prior to its actual requested or committed delivery date. This demand preparation is contained within block 300.

In the normal course of business, some parts may be placed into a "stability file". This file is used to specify parts for which no inventory is to be held at a stocking point. The feature embodied by the stability file is an optional feature of the invention. In one embodiment, this stability concept is implemented by putting high inventory penalties on such parts. For example, in FIG. 4, parts W2 and D2 may be placed into a stability file, which means that the LP has a strong incentive to release manufacturing starts of W2 only if there is sufficient capacity to produce W2 and D2 without waiting at the completion of W2 or D2. In less formal terms, W2 is released only if there is a "clear runway" of enough capacity to enable just-in-time processing. An alternative embodiment would implement stability by putting additional constraints limiting the amount of inventory held of completed W2 and D2 to zero.

Although "stability" is a viable concept in normal operations, it is inappropriate to apply the stability logic in the context of determining those minimum manufacturing starts required to honor contractual foundry obligations. Typically, the contract takes priority over a manufacturer's desire for stability. Consequently, block 302 removes (eliminates) the stability file, if such a file exists, for the purposes of the first linear programming run used to determine the contractually required minimum starts.

Block 304 adds a new set of constraints to the set of linear programming equations. This equation prevents the (first stage) linear program from creating production starts that exceed those explicitly stated in the contract (a.k.a. the minimum nominal manufacturing starts to be released by part m and time period j). For example, the constraint equation may have the following form:

$$\sum_a \sum_e P_{jmae} \leq MinimumNominalStarts_{jm}$$

In the above equation, one skilled in the art will notice that the Minimum Nominal Starts is indexed by part and time period. Other contracts may specify that the Minimal Nominal Starts needs to occur at a particular manufacturing plant location. In such circumstances, one skilled in the art will recognize that the Minimal Nominal Starts may be indexed by plant location as well, and possibly even by manufacturing process depending upon the contractual details.

A final step in preparation for the first stage linear program is contained within block 306. Parts/Plants at the bottom of the bills of material which are not associated with contractual minimum nominal manufacturing starts should be fixed to zero. For example, suppose that W1 of FIG. 4 has contractual minimum nominal manufacturing starts and W2 does not. In this example, W2 should have its production starts fixed to zero for the first stage linear program. This block 306 step is not essential to enabling the method but its use reduces overall execution time.

Block 308 solves the first stage linear program using the data prepared by blocks 300–306. The result is a set of manufacturing starts that the manufacturer is contractually obligated to release. More precisely, the manufacturer is obligated to start at least that many manufacturing releases on a cumulative basis over time. Refer to these as the "minimum starts." Referring again to FIG. 2, the minimum starts determined by block 200 are "satisfied" when determining the production plan in block 202. In other words, the starts resulting from block 202 will be at least as great on a cumulative basis as the minimum starts determined by block 200. Both blocks 200 and 202 use a linear program as their primary solving mechanism. In one embodiment, these linear programs are run in separate directories to provide ready traceability and analysis of the runs in the event questions arise regarding operation of the production planning system. An alternative embodiment could provide a "warm start" connection between the two linear programming invocations. That is, the results of the first LP run could be kept in memory and the second LP run would be a "re-solve" of the first run except using different input conditions. The alternative embodiment has the advantage of quicker run time than one embodiment at a cost of reduced traceability of greater difficulty in analysis.

FIG. 5 summarizes the major steps of block 202. The second stage LP run must consider the full set of demand which includes both foundry and non-foundry demand (ref. block 500). Therefore, when running the second stage LP, the invention removes the constraints created for the first stage run in blocks 304 and 306 (ref. block 502), restores the stability file to its original condition (ref. block 504), and most importantly, adds a constraint which ensures that the minimum starts established by block 200 are satisfied on a cumulative basis in the final production plan (ref. block 506). The latter constraint has a form such as the following.

$$\sum_{j=1}^{t}\sum_{e} P_{jmae} \geq \sum_{j=1}^{t} MinimumStarts_{jma}$$

In the above equation, one skilled in the art will notice that the Minimum Starts is indexed by part, plant, and time period. Alternative embodiments may index the Minimum Starts by part and plant or by part, plant, process, and time period. In general, the fewer the subscripts, the larger the feasible region considered in the second stage LP which tends to result in better solutions at a cost of increased execution time.

The final major step of FIG. 5 is the determination of the production plan through the solving of the second stage LP (ref. block 508). Typically, the production plan resulting from block 508 is consistent with the required contractual obligations. However, a capacity limitation may have prevented the manufacturer from satisfying its contractual obligations. Block 204 identifies such problems so that they may be resolved. This is further detailed in FIG. 6. In FIG. 6, block 600 identifies foundry demand which is backordered. This step compares the foundry demand with the customer shipments contained within the production plan established in block 202. Those foundry demands which are not satisfied by shipments on time are considered "backordered." That is, they will be shipped later than the customer requested date(s). Such late shipments may or may not indicate a probability of contract violation. To find out whether there is a contract concern, it is necessary to determine whether such foundry backorders are supported by starts that are less than the contractual obligation.

Block 602 pegs the backordered foundry demand of block 600 through the bills of material supply chain to find the manufacturing starts supporting them. Refer to the latter as, "pegged starts." This pegging is done using the method described in co-pending U.S. patent application Ser. No. 10/708,119; (inventors Robert Orzell, et al. entitled "METHOD FOR IDENTIFYING PRODUCT ASSETS IN A SUPPLY CHAIN USED TO SATISFY MULTIPLE CUSTOMER DEMANDS"), which is being filed simultaneously herewith and which is incorporated herein by reference above.

For those parts with pegged starts, their total starts in the production plan (including those not pegged) are compared in block 604 with the nominal manufacturing starts specified in the contract. If these total starts are less than the nominal manufacturing starts on a cumulative basis at any point in time on or later than the time corresponding to the release of a pegged start (ref. block 606), then the pegged start and associated backordered foundry demand are highlighted to the analyst as a problem (block 608). That is, corrective action is required so that the manufacturer meets its contractual obligations. Corrective actions could include increases in capacity and/or reductions in manufacturing cycle time. Consequently, the analyst may want to examine capacity input files and capacity utilization reports. Therefore, the invention performs a first stage of linear programming to satisfy only contractually mandated minimum production starts constraints, performs a second stage of linear programming to satisfy additional constraints, and identifies backordered demands. The second stage of linear programming forecasts customer shipments, and wherein the process of identifying backordered demands compares customer demand with the customer shipments. Customer demands that are not satisfied by customer shipments on time are classified as backordered demands and the invention performs a process of "pegging" (i.e., tracing) the backordered demands through a supply chain to identify corresponding production starts. The invention compares the backordered demands with contractual obligations to identify contractual violations and performs corrective actions to eliminate the contractual violations.

Those practiced in the art will recognize that the invention also has the ability to prioritize the allocation of capacity amongst the foundry customers, based on business rules, in case of a capacity limitation or constraint. That is to say, if all the foundry requirements at any given period of time were greater than the capacity available during that period of time, the invention would allow for prioritization of the requirements based on business rules both within the first LP run and the second LP run. So at the end of the second LP run and the post processing steps, not only is the unsatisfied foundry demand identified to the user (as mentioned above) for corrective actions, but this also ensures that the portion of the foundry demand that it could satisfy in the second LP run (due to capacity constraints), is allocated based on business rules.

In addition to the invention's usage in production planning and execution runs, the invention may be used as a sizing tool to evaluate the impact of entering into contracts. Suppose for instance, that during the contract negotiations conducted in block 700 of FIG. 7, the customer requests a particular volume of nominal minimum manufacturing starts to be included in the contract. The manufacturer may re-run the methods of blocks 200–204 (ref. block 702) and check whether the contractual minimum starts proposed by the customer may be satisfied given the manufacturer"s capacity and other data. If block 704 indicates that the proposed contractual terms may not be satisfied, the manufacturer should re-enter negotiations with the customer (or increase capacity or reduce cycle times). On the other hand, if block 704 indicates the proposed terms may be satisfied, the manufacturer is free to close the contract in block 706. Thus, the invention performs a first stage of linear programming to satisfy only contractually mandated minimum production starts constraints, performs a second stage of linear programming to satisfy additional constraints, and evaluates the impact of proposed contracts using results of the first stage of linear programming and the second stage of linear programming. These proposed contracts include minimum manufacturing starts and the process of evaluating the impact of proposed contracts determines whether the manufacturing facility can satisfy minimum manufacturing starts contained within the proposed contracts. If the process of evaluating the impact of proposed contracts determines that the manufacturing facility cannot satisfy minimum manufacturing starts contained within the proposed contracts, the proposed contracts are revised and the evaluating process is repeated. This invention applies to any customer who wants to enter this type of contractual relationship. Non-foundry relationships may still find this invention useful as a means for reserving manufacturing capacity.

Most steps of the present invention have been implemented on an IBM P690 server using the AIX operating system. The steps for implementing the present invention are preferably programmed in C/C++. It should be understood by those of ordinary skill in the art, however, that the represent invention is not limited to the above implementation and is independent of the computer/system architecture. Accordingly, the present invention may equally be implemented on other computing platforms, programming languages and operating systems, and also may be hardwired into a circuit or other computational component.

As shown above, the first LP phase creates wafer starts that are used in a new constraint used by the second LP run, which considers all demand (foundry and non-foundry). This new constraint ensures that the second LP run's wafer starts must be at least as great as those resulting from the first LP run on a cumulative basis across time. In other words, this process first allocates wafer starts only to those customers that have a contractually mandated minimum number of wafer starts, up to the minimum level of wafer starts. After these minimums are allocated, the remainder of the foundry capacity of wafer starts is allocated according to the remaining constraints of the LP program, without having to consider contractually mandated minimum starts. This allows the second LP run to release those foundry wafer starts earlier than required, if so doing allows a better satisfaction of non-foundry demand. The net result is that the second LP run is ensured to meet the contractual obligations while at the same time optimally allocating resources for non-foundry demands. A series of post-processing calculations determine whether any unsatisfied foundry demand stemmed from an inability to meet the contractual wafer starts. This information is provided to the user so that any necessary corrective actions are taken (e.g. capacity increase).

While the invention has been described in terms of the preferred embodiments, those skilled in the art will recognize that the invention can be practiced with modification within the spirit and scope of the appended claims. As example, a heuristic based advanced production planning system could be used instead of a linear program for some of the disclosed steps.

The invention claimed is:

1. A method of allocating production starts in a manufacturing facility using a production planning system, said method comprising:
  performing a first stage of production planning to satisfy only contractually mandated minimum production starts constraints; and
  performing a second stage of production planning to satisfy additional constraints, comprising determining a portion of said additional constraints from output of said performing of said first stage of production planning,
  wherein said performing of said first stage of production planning and said performing of said second stage of production planning comprises allocating said production starts.

2. The method of claim 1, wherein said first stage of production planning only allocates production starts up to contractually mandated minimums.

3. The method in claim 1, wherein said first stage of production planning disables stability constraints, and said second stage of production planning enables stability constraints.

4. The method in claim 1, wherein said first stage of production planning disables constraints relating to customers that do not have contractually mandated minimum production starts obligations, and said second stage of production planning enables constraints relating to customers that do not have contractually mandated minimum production starts obligations.

5. The method in claim 1, wherein said first stage of production planning uses part numbers, time periods and locations in said contractually mandated minimum production starts constraints.

6. The method in claim 1, wherein said first stage of production planning ensures that said second stage of production planning will meet contractually mandated minimum production starts constraints.

7. The method of claim 1, further comprising identifying instances of violations of contractual obligations.

8. The method of claim 1, further comprising designing possible contracts for the purpose of contract negotiation based on said production planning.

9. A method of allocating production starts in a manufacturing facility using a linear programming production planning system, said method comprising:
  performing a first stage of linear programming to satisfy only contractually mandated minimum production starts constraints; and
  performing a second stage of linear programming to satisfy additional constraints, comprising determining a portion of said additional constraints from output of said performing of said first stage of production planning,
  wherein said performing of said first stage of production planning and said performing of said second stage of production planning comprises allocating said production starts.

10. The method in claim 9, wherein said first stage of linear programming only allocates production starts up to contractually mandated minimums.

11. The method in claim 9, wherein said first stage of linear programming disables stability constraints, and said second stage of linear programming enables stability constraints.

12. The method in claim 9, wherein said first stage of linear programming disables constraints relating to customers that do not have contractually mandated minimum production starts obligations, and said second stage of linear programming enables constraints relating to customers that do not have contractually mandated minimum production starts obligations.

13. The method in claim 9, wherein said first stage of linear programming users part numbers, time periods and locations in said contractually mandated minimum production starts constraints.

14. The method in claim 9, wherein said first stage of linear programming ensures that said second stage of linear programming will meet contractually mandated minimum production starts constraints.

15. The method in claim 9, wherein said first stage of linear programming allows said second stage of linear programming to allocate production starts based on constraints other than said contractually mandated minimum production starts constraints.

16. A method of allocating wafer starts in a wafer foundry using a linear programming production planning system, said method comprising:
  performing a first stage of linear programming to satisfy only contractually mandated minimum wafer starts constraints; and
  performing a second stage of linear programming to satisfy additional constraints, comprising determining a portion of said additional constraints from output of said performing of said first stage of production planning,
  wherein said performing of said first stage of production planning and said performing of said second stage of production planning comprises allocating said production starts.

17. The method in claim 16, wherein said first stage of linear programming only allocates wafer starts up to contractually mandated minimums and additional wafer starts are allocated in said second stage of linear programming.

18. The method in claim 16, wherein said first stage of linear programming disables stability constraints, and said second stage of linear programming enables stability constraints.

19. The method in claim 16, wherein said first stage of linear programming disables constraints relating to customers that do not have contractually mandated minimum wafer starts obligations, and said second stage of linear programming enables constraints relating to customers that do not have contractually mandated minimum wafer starts obligations.

20. The method in claim 16, wherein said first stage of linear programming uses part numbers, time periods and locations in said contractually mandated minimum wafer starts constraints.

21. The method in claim 16, wherein said first stage of linear programming allows said second stage of linear programming to allocate wafer starts based on constraints other than said contractually mandated minimum wafer starts constraints.

22. A method of allocating production starts in a manufacturing facility using a linear programming production planning system, said method comprising:
   performing a first stage of linear programming to satisfy only contractually mandated minimum production starts constraints;
   performing a second stage of linear programming to satisfy additional constraints, comprising determining a portion of said additional constraints from output of said performing of said first stage of production planning, and
   identifying backordered demands based on said second stage of linear programming,
   wherein said performing of said first stage of production planning, said performing of said second stage of production planning, and said identifying of said backordered demands comprises allocating said production starts.

23. The method in claim 22, wherein said second stage of linear programming forecasts customer shipments, and wherein said process of identifying backordered demands compares customer demands with said customer shipments.

24. The method in claim 22, wherein customer demands that are not satisfied by customer shipments on time are classified as backordered demands.

25. The method in claim 22, further comprising tracing said backordered demands through a supply chain to identify corresponding production starts.

26. The method in claim 22, further comprising comparing said backordered demands with contractual obligations to identify contractual violations.

27. The method in claim 22, performing corrective actions to eliminate said contractual violations.

28. A method of allocating production starts in a manufacturing facility using a linear programming production planning system, said method comprising:
   performing a first stage of linear programming to satisfy only contractually mandated minimum production starts constraints;
   performing a second stage of linear programming to satisfy additional constraints; comprising determining a portion of said additional constraints from output of said performing of said first stage of production planning; and
   evaluating the impact of proposed contracts using results of said first stage of linear programming and said second stage of linear programming,
   wherein said performing of said first stage of production planning, said performing of said second stage of production planning, and said evaluating of said impact of said proposed contracts comprises allocating said production starts.

29. The method in claim 28, wherein said proposed contracts include minimum manufacturing starts.

30. The method in claim 28, wherein said process of evaluating the impact of proposed contracts determines whether said manufacturing facility can satisfy minimum manufacturing starts contained within said proposed contracts.

31. The method in claim 28, wherein if said process of evaluating the impact of proposed contracts determines that said manufacturing facility cannot satisfy minimum manufacturing starts contained within said proposed contracts, said proposed contracts are revised and said evaluating process is repeated.

32. A program storage device readable by machine, tangibly embodying a program of instructions executable by the machine to perform a method of allocating production starts in a manufacturing facility using a linear programming production planning system, said method comprising:
   performing a first stage of linear programming to satisfy only contractually mandated minimum production starts constraints; and
   performing a second stage of linear programming to satisfy additional constraints, comprising determining a portion of said additional constraints from output of said performing of said first stage of production planning,
   wherein said performing of said first stage of production planning and said performing of said second stage of production planning comprises allocating said production starts.

33. The program storage device in claim 32, wherein said first stage of linear programming only allocates production starts up to a contractually mandated quantity.

34. The program storage device in claim 32, wherein said first stage of linear programming disables stability constraints, and said second stage of linear programming enables stability constraints.

35. The program storage device in claim 32, wherein said first stage of linear programming disables constraints relating to customers that do not have contractually mandated minimum production starts obligations, and said second stage of linear programming enables constraints relating to customers that do not have contractually mandated minimum production starts obligations.

36. The program storage device in claim 32, wherein said first stage of linear programming uses part numbers, time periods and locations in said contractually mandated minimum production starts constraints.

37. The program storage device in claim 32, wherein said first stage of linear programming ensures that said second stage of linear programming will meet contractually mandated minimum production starts constraints.

38. The program storage device in claim 32, wherein said first stage of linear programming allows said second stage of linear programming to allocate production starts based on constraints other than said contractually mandated minimum production starts constraints.

* * * * *